United States Patent [19]

Pesic

[11] Patent Number: 4,778,519
[45] Date of Patent: Oct. 18, 1988

[54] RECOVERY OF PRECIOUS METALS FROM A THIOUREA LEACH

[76] Inventor: Batric Pesic, 1913 Conestoga, Moscow, Id. 83843

[21] Appl. No.: 35,388

[22] Filed: Apr. 7, 1987

Related U.S. Application Data

[63] Continuation-in-part of Ser. No. 17,909, Feb. 24, 1987.

[51] Int. Cl.$^4$ .............................................. C22B 11/04
[52] U.S. Cl. ............................... 75/118 R; 75/101 R; 75/101 BE; 75/103; 75/108; 75/115; 423/24; 423/27; 423/33; 423/34; 423/36; 423/41; 423/43; 423/45; 210/702; 210/711; 210/729; 204/109
[58] Field of Search ........................ 423/24, 27, 32, 33, 423/34, 36, 42, 43; 75/108, 101 R, 103, 118 R, 101 BE, 115; 210/702, 711, 729; 204/109

[56] References Cited

U.S. PATENT DOCUMENTS

| | | | |
|---|---|---|---|
| 3,920,403 | 11/1975 | Ross ................................. | 75/118 R |
| 3,935,006 | 1/1976 | Fischer ........................... | 75/101 BE |
| 3,970,737 | 7/1976 | Davidson ........................ | 423/27 |
| 4,145,212 | 3/1979 | Bodson ........................... | 75/118 R |
| 4,208,378 | 6/1980 | Heinen et al. .................. | 423/27 |
| 4,267,069 | 5/1981 | Davidson et al. .............. | 75/118 R |
| 4,342,591 | 8/1982 | Lesoille ......................... | 423/27 |
| 4,561,947 | 12/1985 | Schulze ......................... | 204/109 |
| 4,595,572 | 6/1986 | Ogasa et al. ................... | 75/108 |
| 4,606,766 | 8/1986 | Genik-Sas-Berezowsky et al. ................................. | 75/108 |
| 4,645,535 | 2/1987 | Little ............................... | 423/32 |

OTHER PUBLICATIONS

B. Pesic and J. E. Way, "Carbon Adsorption of Silver From Acidified Thiourea Solutions," presented at the Society of Mining Engineers Annual Meeting in New Orleans, La., Mar. 2–6, 1986.
Chemical Abstracts 93:76833q.
Chen, C. K. et al., Hydrometallurgy, 5 (1980), 207–212.
Schulze, R. G., SKW Trostberg Aktiengesellschaft Publication Presented at the International Precious Metals Symposium in Los Angeles, Feb. 27–29, 1984.

*Primary Examiner*—Robert L. Stoll
*Attorney, Agent, or Firm*—Marvin S. Towsend

[57] ABSTRACT

A method is provided for recovering gold and silver from precious metal bearing materials including ores, leaching residues, flue dust, electronic scrap, jewelry scrap, etc. In the method, the gold and silver are extracted from the precious metal bearing materials with a thiourea solution to form a thiourea leach, and the thiourea leach is contacted with carbon to adsorb the gold and silver and provide loaded carbon. The method is characterized by the step of contacting an alkaline solution of thiousulfate ion with the loaded carbon thereby desorbing the precious metals form the carbon. In one modification of the method, an additional step includes adding a salt to the aqueous thiousulfate solution. When needed, the method includes the step of protecting the thiousulfate ion from oxidizing agents. This is done by adding a reducing agent such as sodium sulfite to the thiousulfate solution. When copper is present, the method includes the addtional step of removing copper from the carbon prior to exposing the carbon to the thiourea solution containing the precious metals.

28 Claims, 18 Drawing Sheets

RECOVERY OF PRECIOUS METALS FROM A THIOUREA LEACH

CROSS-REFERENCE TO CO-PENDING APPLICATION

The present invention is a C-I-P application of co-pending application Ser. No. 17,909 filed Feb. 24, 1987 by Batric Pesic.

FIELD OF THE INVENTION

The present invention relates to the field of recovery of valuable metals from precious metal bearing materials including ores, leaching residues, flue dust, electronic scrap, jewelry scrap, etc. More particularly, the present invention relates to the recovery of gold and silver from activated carbon loaded from leach solutions from thiourea leaching of the precious metal bearing materials.

BACKGROUND OF THE INVENTION

In recent years thiourea has attracted considerable attention in hydrometallurgy of the precious metals gold and silver. One of the reasons for the given attention is the kinetic superiority of thiourea leaching compared to cyanide leaching. Another reason is thiourea's substantially less toxic nature than cyanide. Thus, thiourea may very well be used as a substitute for cyanide in many hydrometallurgical applications.

The hydrometallurgy techniques using thiourea share similarities to the already well known cyanidation techniques. In other words, thiourea can be used in similar types of unit operations that are used with cyanide. However, a significant difference between thiourea and cyanide leaching techniques is the pH of the leach solutions that are used. Cyanide must be used in basic solutions to prevent evolution of toxic gaseous hydrogen cyanide. In contrast, thiourea is used in acidified solutions.

The main unit operations in a thiourea leaching method are (1) thiourea leaching (by agitation, dump, or heap leaching), (2) recovery of dissolved gold and silver on activated carbon, (3) carbon elution, and (4) recovery of gold and silver from the elution solutions.

Adsorption of the precious metals on activated carbon can be done either in pulp (CIP), during leaching (CIL), or from leach solution obtained after solid liquid separation. Sometimes the adsorption of gold and silver onto carbon from the leach solution can be bypassed, and these metals can be recovered either directly (e.g. by electrowinning or chemical precipitation), or after preconcentration (e.g. by solvent extraction or ion exchange). Preferably, however, gold and silver is recovered using activated carbon.

After adsorption of gold and/or silver on activated carbon, the precious metals must be desorbed from the activated carbon. Desorption of carbon, also called elution, must be performed under different conditions from the conditions during adsorption, otherwise the loaded metals wouldn't be eluted from the carbon surface.

The adsorption of gold on carbon has been studied and reported in a survey of gold adsorption on carbon (Lodeishchikov and Panchenko in Using Activated Carbon for the Sorption of Gold from Acid Solutions of Thiourea, Tsvetn. Met., Vol. 9, No. 4, pp. 33-35, 1968). In this publication, test results on the loading capacity of charcoal using gold-containing acidified thiourea solutions were presented. Several different leach solutions were tested along with a solution obtained during the elution of gold from an ion exchange resin. The effects of pH, different ions in solution, and thiourea concentration were not studied, and the adsorption rate and adsorption isotherms were not determined. A separate test demonstrated that silver adsorption on activated charcoal was also possible.

In general, there has been very little work done on the elution of gold and silver from activated carbon where the precious metals are loaded from thiourea solutions.

Even in the process of cyanidation of gold and silver, the elution step has serious deficiencies, primarily with respect to kinetics. The elution of gold and silver from a cyanide solution can last from 10 hours to 4 days. The reason for the slow elution rate of the cyanide metal complexes is the strong adsorption of gold and silver cyanide complexes on activated carbon.

Furthermore, a complex desorption process was reported in the literature wherein thiosulfate ion was employed for desorbing silver from carbon loaded from a cyanide solution. More specifically, Veronese and Davidson in Chemical Abstracts 93:76833q disclose two desorbing steps to desorb gold and silver from activated carbon loaded from a cyanide solution. The first desorption step employs alkaline thiosulfate solution, and the silver is preferentially desorbed by three alkaline thiosulfate elutions leaving essentially all of the gold on the carbon. The gold is then desorbed by a second desorbing solution comprised of alkaline sodium cyanide. This abstract is based on South African patent No. 78/05464.

Other eluants are disclosed in the prior art for desorbing metals from carbon. For example, Heinen et al. in U.S. Pat. No. 4,208,378 disclose desorption of gold from activated carbon using a solution comprised of water soluble alcohol and aqueous base. Davidson et al. in U.S. Pat. No. 4,267,069 disclose regeneration of activated carbon using a carbonate or bicarbonate solution. Ross in U.S. Pat. 3,920,403 discloses a method of desorbing gold from activated carbon using a stripping liquid comprised of water, dilute caustic, or dilute caustic cyanide. Fischer in U.S. Pat. No. 3,935,006 uses ketones or alcohols to desorb gold from activated carbon. Davidson in U.S. Pat. No. 3,970,737 uses softened water to desorb gold from activated carbon loaded from a cyanide solution. Ogasa et al. in U.S. Pat. No. 4,595,572 disclose recovering gold and silver from an aqueous cyanic solution on activated carbon.

SUMMARY OF THE INVENTION

Accordingly, it is a primary object of the present invention to provide an efficient method for desorbing precious metals from carbon loaded from thiourea solutions.

Another object of the invention is to provide an efficient method for desorbing valuable metals from carbon employed in a nontoxic method of extracting the metals from silver and/or gold bearing materials including ores, leaching residues, flue dust, electronic scrap, and jewelry scrap.

Another object is to provide a method of silver and gold recovery from carbon loaded from a thiourea solution wherein the method uses one elution step for desorbing both the silver and the gold from the precious metal bearing materials.

Another object is to provide a method of silver and gold recovery from carbon loaded from a thiourea solution wherein the method uses a first elution step for desorbing the gold from the carbon and a second elution step for desorbing the silver from the carbon.

Additional objects, advantages, and novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, a novel method for recovering precious metals from precious metal bearing materials including ores, leaching residues, flue dust, electronic scrap, jewelry scrap, etc. is provided. In the method, the precious metals are extracted from the precious metal bearing materials with a thiourea solution (preferably acidified thiourea), and the thiourea leach is contacted with carbon to adsorb the precious metals. The method is characterized by the step of contacting thiosulfate ion with the carbon loaded with the precious metals from the thiourea solution. The thiosulfate ion (preferably in alkaline solution) desorbs (elutes) the precious metals from the carbon. The precious metals are preferably gold and/or silver.

In one modification of the method of the invention, an additional step includes adding a salt to the aqueous thiosulfate solution. The added salt is preferably selected from the group consisting of alkali-metal and alkaline-earth-metal chlorides, nitrates, and sulfates.

The thiosulfate concentration can be present in a broad range covering from 0.1 gram per liter to a saturated solution.

The pH of the aqueous thiosulfate solution is in a range having a lower end and an upper end. The lower end of the pH of the solution is determined by the stability of the thiosulfate ion in the aqueous solution, and the upper end of the pH of the solution is determined by the stability of the carbon in the presence of the aqueous solution. Preferably, the pH of the aqueous thiosulfate solution is in the range of pH=8-10.5.

The temperature of the thiosulfate solution can be in the range from 1-100 degrees centigrade or higher, such as the boiling point of the solution.

The pressure at which the thiosulfate contacted with the carbon is in the range from normal atmospheric pressure to 100 pounds per square inch.

Preferably, the thiosulfate ion is obtained from a compound selected from the group consisting of alkali metal thiosulfates, alkaline earth metal thiosulfates, and ammonium thiosulfate. More specifically, the thiosulfate ion may be obtained from a compound selected from the group consisting of sodium thiosulfate, ammonium thiosulfate, potassium thiosulfate, and calcium thiosulfate.

The preferred form of carbon for adsorbing the precious metals is activated carbon.

When necessary, the method includes the step of protecting the thiosulfate from oxidizing agents. This is done by adding a reducing agent to the thiosulfate solution. The reducing agents are selected from the group consisting of sulfites, e. g. sodium sulfite.

When copper is present, the method includes the additional step of preventing copper from being adsorbed onto the carbon prior to exposing the carbon to the thiourea solution containing the gold and silver. This involves removing copper from the thiourea leach solution prior to loading the solution onto the carbon.

Another step may be employed with the method of the invention. This step involves treating the carbon loaded with the precious metals with a material selected from the group consisting of hydrogen peroxide prior to treating the carbon with thiosulfate.

In accordance with another aspect of the invention, a modified method is provided for recovering gold and silver from precious metal bearing materials using thiosulfate leaching and carbon loading. In the method, a first thiosulfate ion solution is contacted with the loaded carbon under a first set of contacting conditions including temperature, concentration of thiosulfate ion, and duration of contact to form a first thiosulfate leach solution containing gold. Then, the first thiosulfate leach solution is separated from the carbon leaving a carbon residue containing silver.

The silver is recovered from the carbon residue by contacting a second thiosulfate ion solution with the carbon residue under a second set of contacting conditions including temperature, concentration of thiosulfate ion, and duration of contact to form a second thiosulfate leach solution containing silver. Generally, the first set of eluting conditions for eluting the gold are milder than the second set of eluting conditions for eluting the silver.

In accordance with another aspect of the invention, a method is provided for recycling desorbed carbon to be used again for precious metal absorption. The desorbed carbon is deactivated by the alkaline conditions under which the thiosulfate elution is conducted. However, when the desorbed carbon is contacted with another quantity of acidified thiourea leach solution, the carbon is reactivated and permits the adsorption of the thiourea complexes of gold and silver thereon.

Although the principles of the method of the invention have been described primarily in the context of recovering precious metals from raw materials which bear precious metals, it is understood that the same principles can be applied to the separation and recovery of precious metals generally. More specifically, the thiosulfate elution step can be applied to the recovery of gold and silver from carbon loaded with a thiourea leach in the context of a laboratory analysis for gold and silver.

In one modification, in accordance with the principles of the invention, thiourea derivatives, instead of or in conjunction with generic thiourea, can be employed.

Although many thiourea derivatives are, at the present time, relatively expensive and not available in large quantities, it is contemplated that such thiourea derivatives could be used with the invention if such derivatives became less expensive and more readily available in the future.

In addition, with respect to thiourea derivatives, it is known that some thiourea derivatives are more toxic than generic thiourea. In contemplating the use of such derivatives, their toxicity would be an important consideration.

The important characteristics of the thiourea derivatives, with respect to their utilization in accordance with the invention, are that they dissolve both gold and silver in a precious metal bearing material in an acidified solution and that they load carbon with gold and silver complexes that are leachable by thiosulfate.

Thiourea derivatives that are contemplated include: N-methylthiourea, N-ethylthiourea, N-isopropylthiourea, N-(n-butyl)-thiourea, N-phenylthiourea, N-benzylthiourea, N-naphthylthiourea, N-tolylthiourea, N-(o-chlorophenyl)-thiourea, N-(p-hydroxyphenyl)-thiourea, N-(p-ethoxyphenyl)-thiourea, N-(2,4-dimethylphenyl)-thiourea, N-acetylthiourea, N-benzoylthiourea, N,N-dimethylthiourea, N,N-diethylthiourea, N,N-dipropylthiourea, s-dimethylthiourea, s-diisopropylthiourea, s-di-n-butylthiourea, s-diphenylthiourea, s-ditolylthiourea, N,N-phenyltolylthiourea, N,N,N'-trimethylthiourea, N,N,N'-triethylthiourea, and N,N,N'-tripropylthiourea among others.

The particular acid that is used for acidifying the thiourea is not critical. For example, sulfuric acid, hydrochloric acid, and nitric acid can be used.

The precious metal bearing ore that is used can be selected from the group consisting of in situ ore, mined ore, comminuted ore, and ore concentrate. It is understood that a given ore sample can have more than one group characteristic. For example, a mined ore can be comminuted, or an ore concentrate can be obtained from a comminuted ore sample.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF A PREFERRED EMBODIMENT

As discussed in greater detail below, gold and silver thiourea complexes adsorb very strongly on the surface of activated carbon. An efficient desorption method has been discovered by the present inventor to effectuate elution and recovery of precious metals from carbon loaded with thiourea solutions, by hydrometallurgy.

The present inventor considered many systems for desorption of gold and silver from activated carbon loaded from thiourea solutions. The following materials were tested and none were successful for desorbing the metals from carbon: strong thiourea solutions, strong chloride ion solutions; acetonitriles; cyanides; alcohols; hydrogen peroxide; and sulfites.

In an effort to discover an effective system for desorbing precious metals from activated carbon, a study of the theoretical background of the adsorption/desorption process was undertaken. The adsorbability of various ions on activated carbon was studied, and the ions which adsorbed the most strongly were identified. Those ions which have a stronger tendency than silver or gold thiourea complexes to be adsorbed on activeated carbon will desorb gold and silver from the surface of the carbon.

When the adsorbability of a number of ions was examined, it was discovered that there is the following order of adsorption strength: chloride<bromide<iodide<<thiosulfate. From the inventor's discovery of this order of adsorbability, it was determined that thiosulfate ion has the strongest adsorbabilty properties among the ions tested.

Then experiments were devised to evaluate the performance of the thiosulfate ion for elution of gold and silver loaded on carbon from thiourea solutions.

Figure 1:
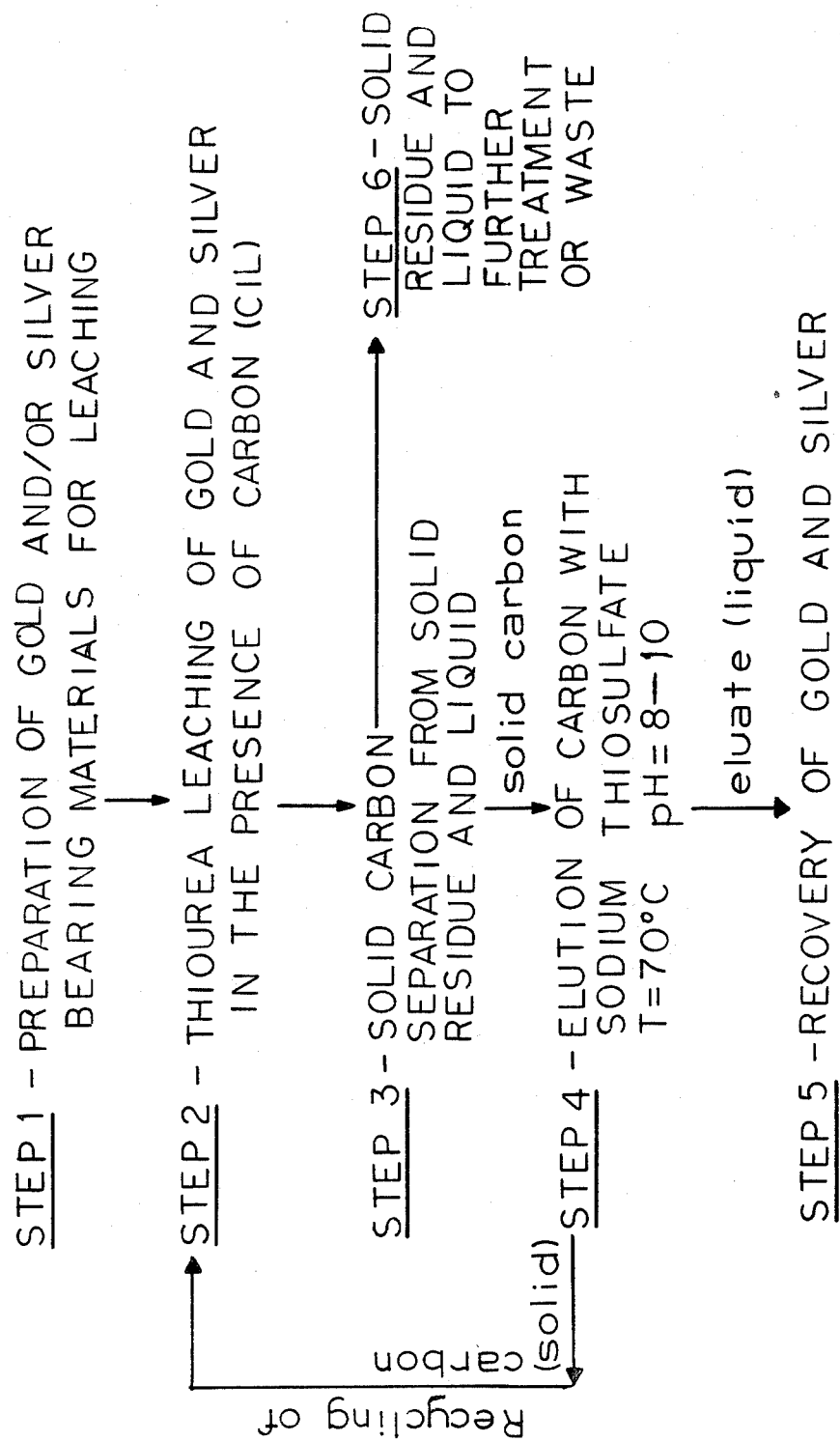
FIG. 1 is a schematic diagram of a method of the invention for obtaining silver and gold metal from a material containing silver and gold.
Figure 2:
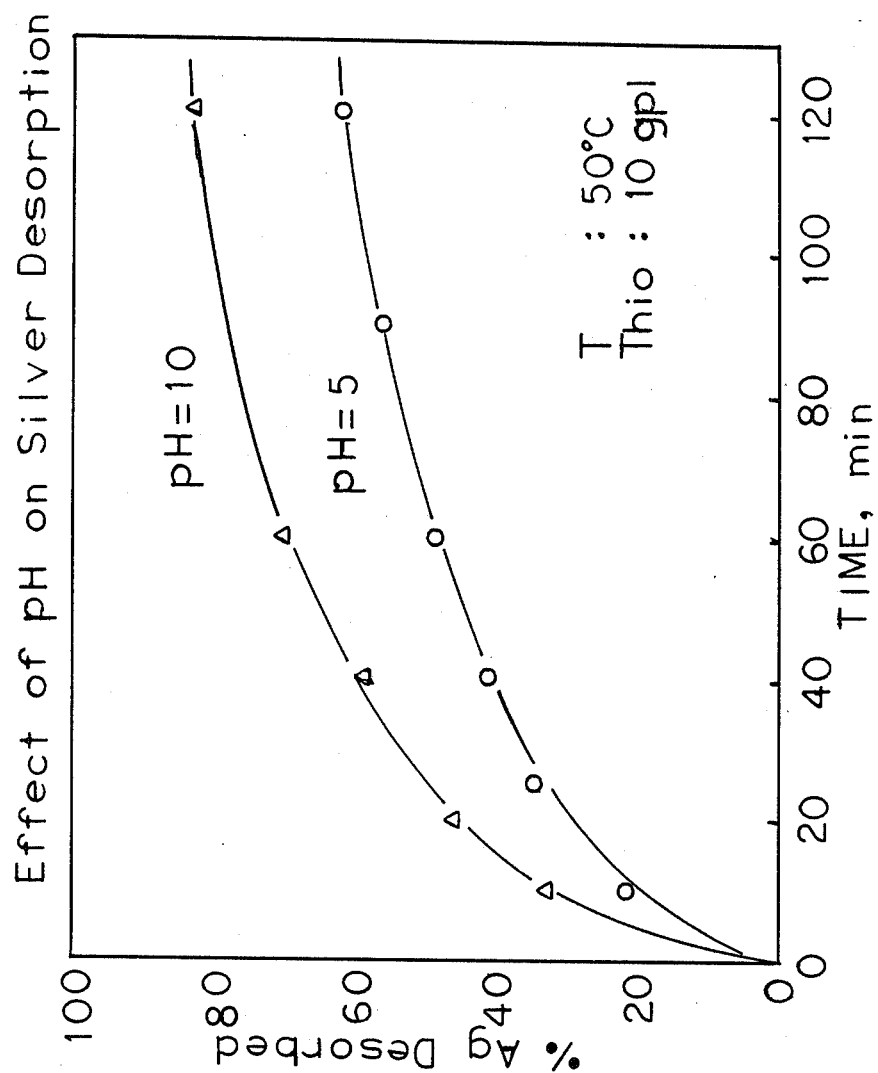
FIG. 2 is a graph depicting the effect of pH on the thiosulfate desorption of silver from carbon loaded with a thiourea solution.

Reference is made to FIG. 1 which shows a flowsheet for the method of the invention for recovering gold and silver from a material (e.g. an ore) using activated carbon loaded from thiourea solutions. The flowsheet in FIG. 1 would not be used in exact form in each practical application, and can be modified substantially according to individual process conditions. However, the elution step in any practical application would involve the use of a thiosulfate ion, preferably though not exclusively in aqueous solution.

In the flowsheet of FIG. 1, the first step involves the preparation of the gold and silver bearing materials for leaching with acidified thiourea solutions. The preparation could involve comminution or preparation for in situ mining.

In the second step, a carbon-in leach (CIL) step can be used; that is carbon can be present during the thiourea leach. However, this leaching step doesn't need to be a carbon-in leach step. Otherwise, the material can be leached with thiourea first, and then treated with carbon (in pulp) for transfer of gold and silver onto the carbon. This would be the so-called carbon-in-pulp (CIP) process. Also this step can involve adsorption of gold and silver from thiourea solutions from virtually any source (head leaching of ores, dump leaching of ores, leaching of residues, leaching of scrap, etc.).

The reason that CIL was chosen is that the rate of gold and silver leaching is comparable with the rate of adsorption of these metals on carbon.

The third step in FIG. 1 involves separating the solid carbon, which contains the adsorbed metals, from the other materials both liquid and solid present in the thiourea leaching step (the second step). For example, when the solid carbon is in the presence of both a liquid and a solid pulp, the carbon can be separated from the rest of the materials by a simple screening step. More particularly, the carbon can be present in the form of relatively large particles, 2-3 millimeters in diameter. The pulp particles would be much smaller, in the range of 50-100 microns. Therefore, a screen having a mesh which passes a liquid and particles smaller than 2 millimeters but retains particles larger than 2 millimeters can be used to separate the liquid and pulp from the carbon after the thiourea step has been conducted. After the carbon is separated in step #3, the carbon is subjected to step #4.

The fourth step in FIG. 1 involves the recovery of adsorbed gold and silver from loaded carbon by desorption (elution) with thiosulfate. The application of thiosulfates for gold and silver desorption is the key of this invention. Sodium thiosulfate is a suitable representative thiosulfate. The chosen conditions are $T=70$ deg. C and $pH=8-10$. Other conditions can be chosen, however, depending on the particular overall plant practice.

In this step, the eluate solution, containing gold and silver, is further sent to gold and silver recovery (Step #5).

In the fourth step, the desorbed carbon is recycled back to the Step #2 where it is contacted with more acidified thiourea to reactivate the carbon for adsorption of new amounts of gold and silver. This is another important aspect of the present invention: direct recycling of carbon without any further pretreatment. The reason why this is possible comes from the difference of pH values at which adsorption and desorption take place. Thus, while adsorption of gold and silver takes place from acidified thiourea solutions, the desorption of these metals takes place at high pH values. When the desorbed carbon is recycled back to the adsorption step, the acidic nature of the thiourea leaching solution activates the surface of carbon enabling renewed adsorption properties of the same carbon. Thus, the low pH activates adsorption of gold and silver, and high pH promotes desorption of these metals.

The fifth step in FIG. 1 involves recovery of gold and silver from the eluate from Step #4. Recovery can be achieved by any conventional means: electrowinning, chemical precipitation, or cementation.

If desired, a Step #6, involving further treatment of the liquid and pulp separated from the carbon prior to elution of the carbon with thiosulfate, can be employed. Otherwise, the liquid and pulp can be sent to waste disposal.

Thiosulfate ion can be provided by using a wide variety of thiosulfate compounds. The most well known ones are sodium thiosulfate, ammonium thiosulfate, and calcium thiosulfate. Sodium thiosulfate is a well known ingredient in the photographic industry where it is used as a developer. Ammonium thiosulfate is another well known thiosulfate compound, but its use for silver recovery is not recommended because of the explosive nature of silver-ammonium compounds. However, its use in gold recovery would not pose any problem.

Sodium thiosulfate was used to provide the necessary thiosulfate ions. Sodium thiosulfate ion is the least expensive, and that is another important advantage of this compound.

To test the performance of the thiosulfate ion during elution of silver, activated carbon had to be loaded first. The loaded activated carbon was then treated with sodium thiosulfate solutions under various conditions.

Carbon was loaded with silver from two kinds of solutions, silver-thiourea in sulfate and silver-thiourea in chloride solutions. Silver-thiourea complex, $Ag(TU)_2Cl$ was prepared and dissolved in a hydrochloric acid-thiourea solution to give a working stock solution of 2 gpl silver in 0.2M thiourea. The stock solution was subsequently diluted to the desired concentration of silver and thiourea for each experiment with deionized water or hydrochloric acid solution.

Thiourea solutions used in the determination of thiourea adsorption isotherms were prepared by dissolving the required amount of analytical grade thiourea in 0.1M sulfuric acid solution.

To examine the elution of gold with thiosulfate, carbon was loaded with gold also from two different solutions, gold-thiourea in sulfate and gold-thiourea in chloride medium. Desorbed silver and gold were analyzed by atomic adsorption, and the gold and silver remaining on the carbon were analyzed by fire assaying.

The carbon employed in the experiments described herein is an activated carbon produced by the Westates Carbon Company, Los Angeles, Calif. and was obtained from hard coconut shells . The carbon was pulverized and dry sieved into particle size fractions in the range passing through No. 48 sieve (Tyler) and retained on No. 150 sieve (Tyler). The moisture content after drying at 110 deg. C was less than 0.12% for all sizes, and the fraction passing through sieve No. 48 and retained on sieve No. 80 was used for all experiments described herein. Virtually any commerically available activated carbon would also be suitable for carrying out the invention.

All experiments were performed in a one liter glass reactor surrounded by a temperature controlled water bath and equipped with a stirrer, a gas sparge tube, condenser, and a sample tube. For the experiments conducted with the silver-thiourea complex, 750 milliliters of solution containing the desired concentration of silver and thiourea was placed in the reactor, and a known amount of carbon passing through No. 48 and retained on No. 80 sieves was added after reaching the desired temperature. Then, 5 milliliter samples were withdrawn periodically for analysis of silver by atomic absorption. A similar procedure was followed for the pure thiourea adsorption isotherms, except that no silver was present. Determination of thiourea remaining in solution from the thiourea-carbon adsorption isotherm experiments was performed by mercuric nitrate titration.

Other experiments for providing the data depicted in FIGS. 2-18 were conducted in analagous ways. For example, experiments were performed with gold-thiourea complexes following the procedures described above for silver by substituting gold for silver.

As theoretically predicted, sodium thiosulfate ion can efficiently desorb silver from activated carbon loaded from thiourea solutions. When thiosulfate ion is added, it preferentially adsorbs on activated carbon displacing silver-thiourea complexes which go into solution. Silver from the eluate solution can be recovered by conventional means (electrowinning, cementation, chemical precipitation, etc.). The main process parameters are pH, concentration of thiosulfate, and temperature.

With respect to pH, desorption of silver with sodium thiosulfate is faster and more efficient at higher pH. See FIG. 2. It is noted that about 80% of silver can be desorbed in only two hours, at T=50 deg. C, pH=10 with 50 grams per liter (gpl) of thiosulfate. The lower pH limit is set by the stability of sodium thiosulfate, and the higher pH limit is set by the stability of activated carbon. Sodium thiosulfate becomes unstable below pH=4, and it is especially unstable in the presence of strong acids, such as sulfuric acid, hydrochloric acid, etc. In cases where lower pH values are needed, then the pH must be adjusted with weak acids, such as acetic acid, for example.

Carbon becomes unstable at pH values above 12, depending how the pH value is adjusted. If a strong base is used, such as sodium hydroxide or ammonia, then carbon becomes unstable, and falls apart. It was found that it was better to use sodium carbonate (soda ash), or lime to adjust pH. Carbon in that case was very stable, and no disintegration was noticed. The selection of a reagent for pH adjustment, is an important process parameter and must be considered in an actual plant operation when thiosulfates are used for elution.

Figure 3:
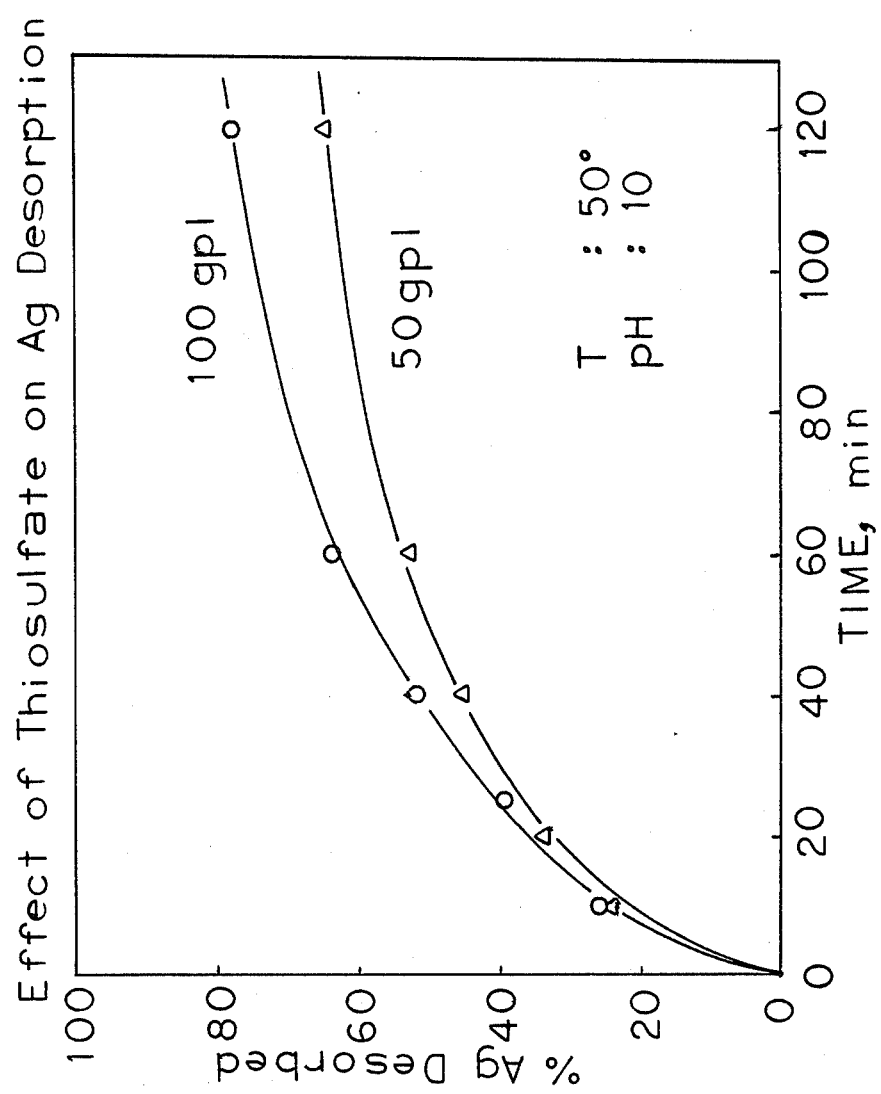
FIG. 3 is a graph depicting the effect of thiosulfate concentration on the thiosulfate desorption of silver from carbon loaded with a thiourea solution.

Sodium thiosulfate concentration is another important parameter. In general the higher concentration of sodium thiosulfate the higher the rate of silver desorption. Actual concentration of thiosulfate should be determined by individual plants, and the main determining factors for the desired concentration of thiosulfates should be kinetics, and desired amount of soluble silver in the eluate. It is well known that solubility of silver in thiosulfates is a function of thiosulfate concentration. (Mellor, J. E.: A Comprehensive Treatise on Inorganic and Theoretical Chemistry, Vol. III, 1928). As illustrated in FIG. 3, higher concentrations of thiosulfate produced higher elution of silver, although an even stronger effect was expected. The reason for the less than expected effect of for sodium thiosulfate in the given case is the abundance of the reagent, 50 and 100 gpl, compared to the amount of treated carbon, 1 gram. In actual plant practice, where the ratio of eluting solution to carbon is much smaller, the concentration of thiosulfates would have much more pronounced effects.

Figure 4:
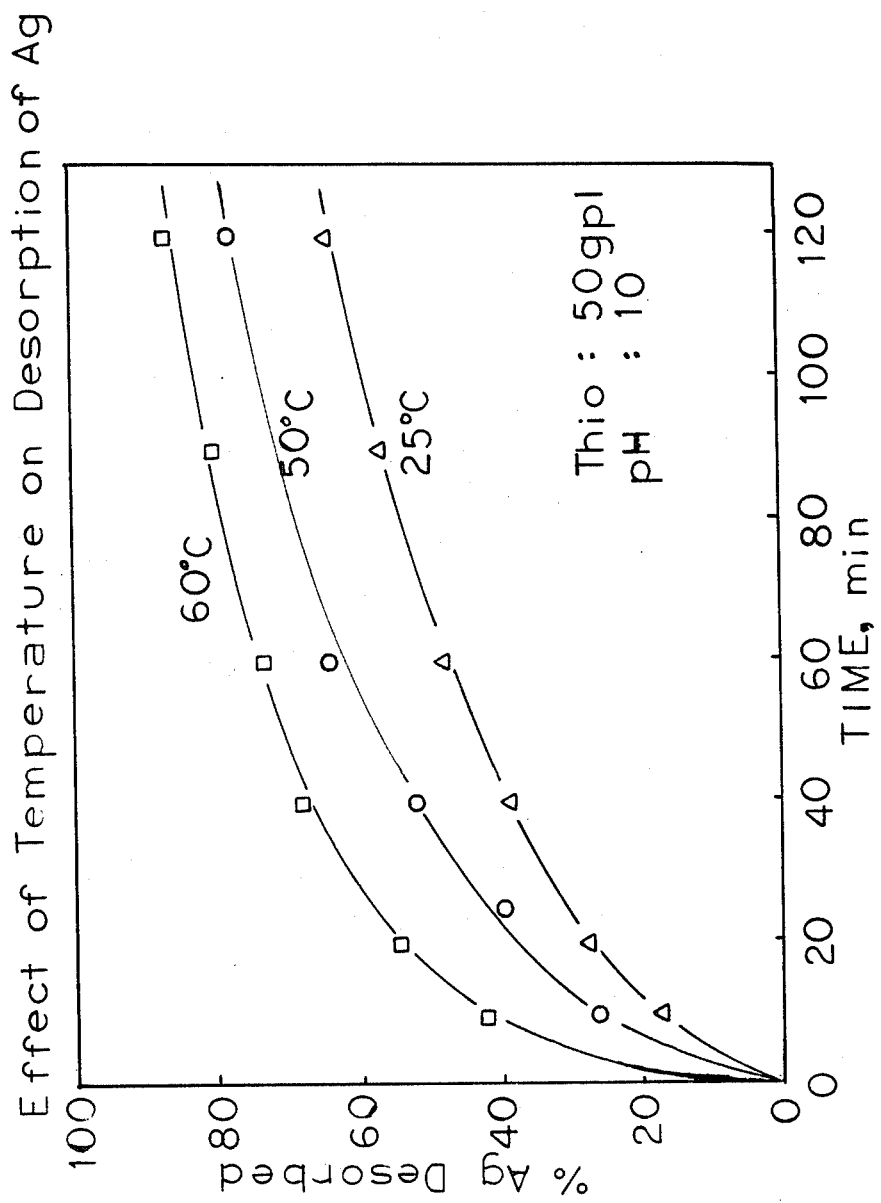
FIG. 4 is a graph depicting the effect of temperature on the thiosulfate desorption of silver from carbon loaded with a thiourea solution.
Figure 5:
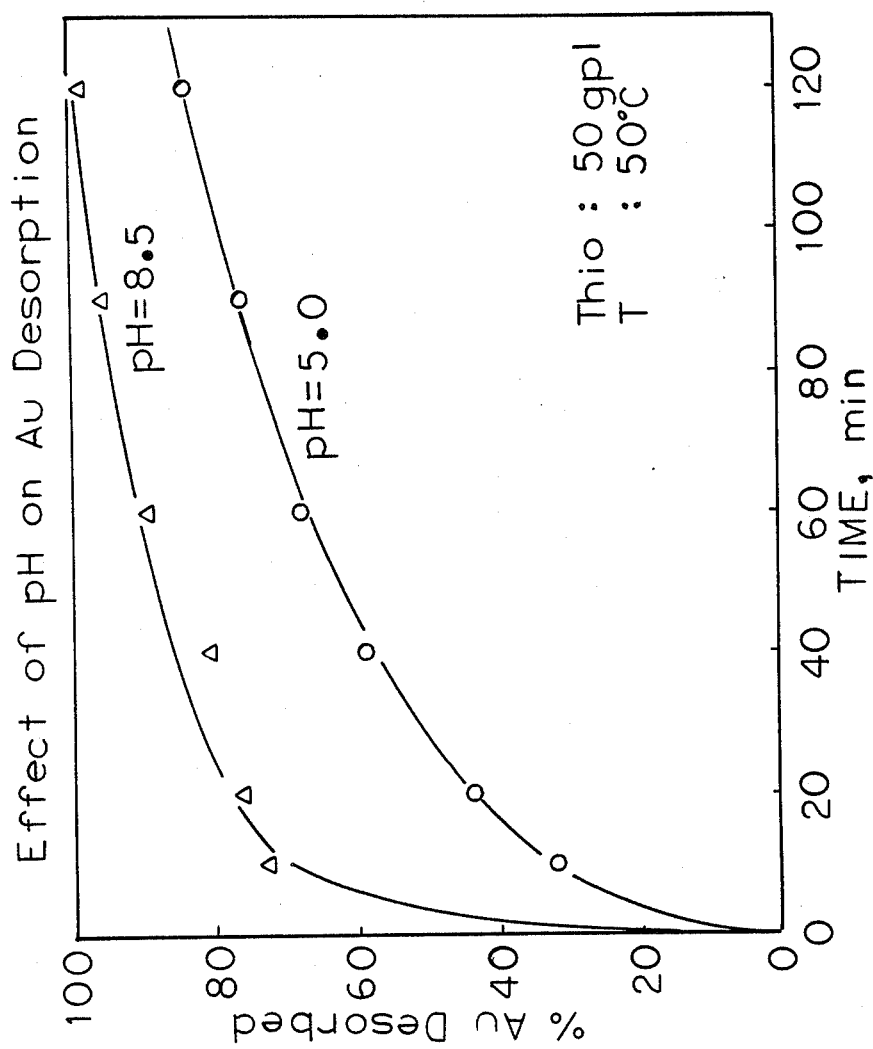
FIG. 5 is a graph depicting the effect of pH on the thiosulfate desorption of gold from carbon loaded with a thiourea solution.
Figure 6:
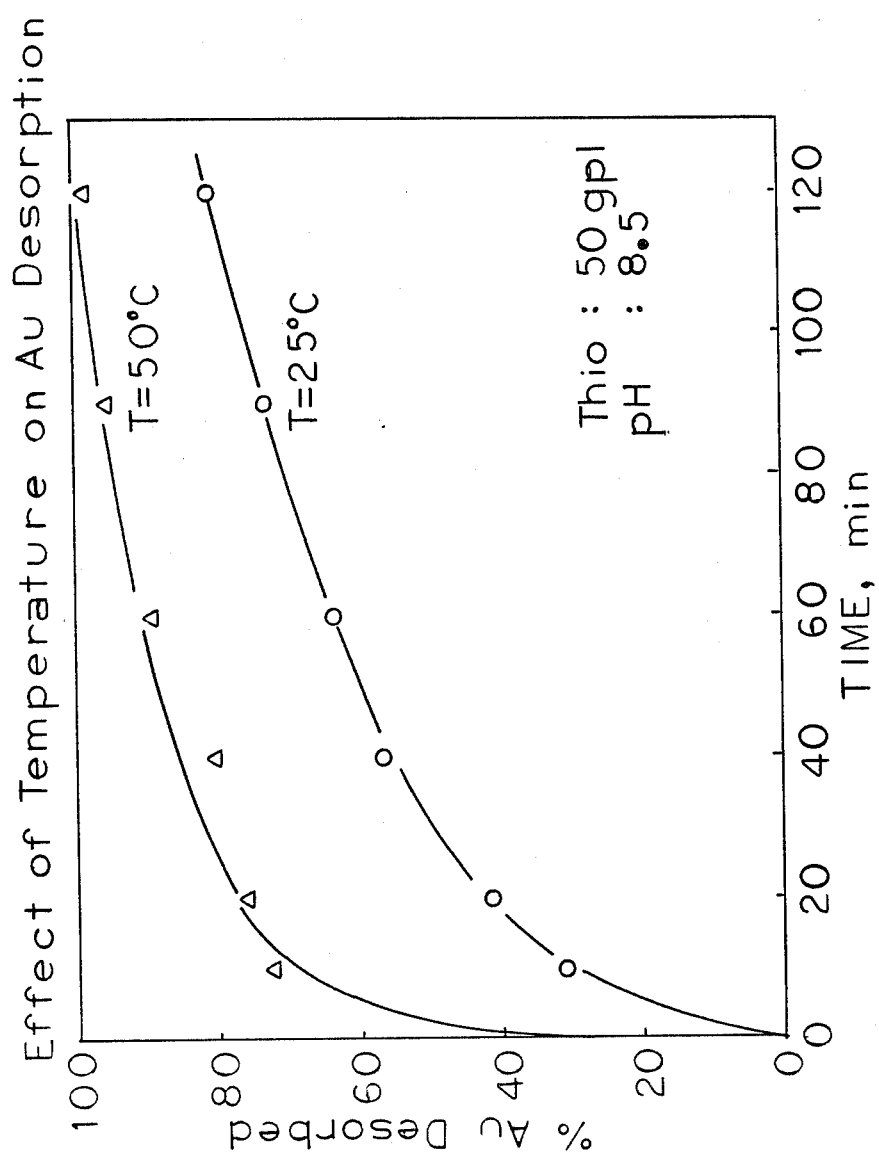
FIG. 6 is a graph depicting the effect of temperature on the thiosulfate desorption of gold from carbon loaded with a thiourea solution.
Figure 7:
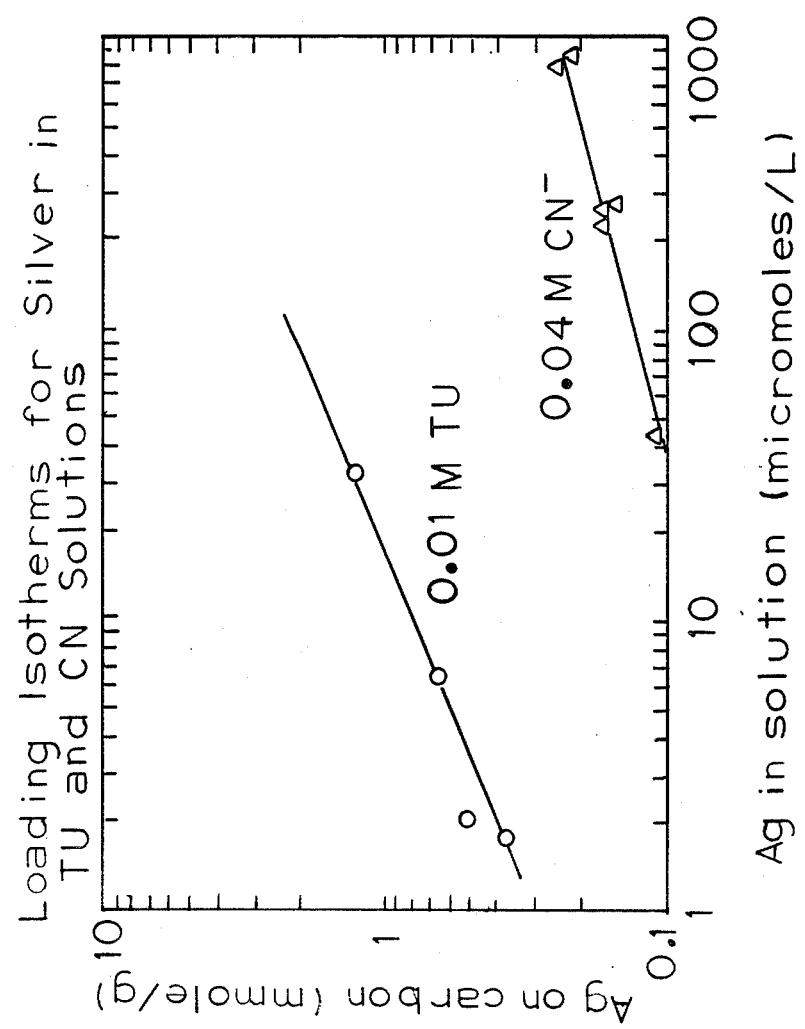
FIG. 7 is a graph showing the increased efficiency of loading of silver on carbon from thiourea solutions as compared to loading the carbon with silver from cyanide solutions.
Figure 8:
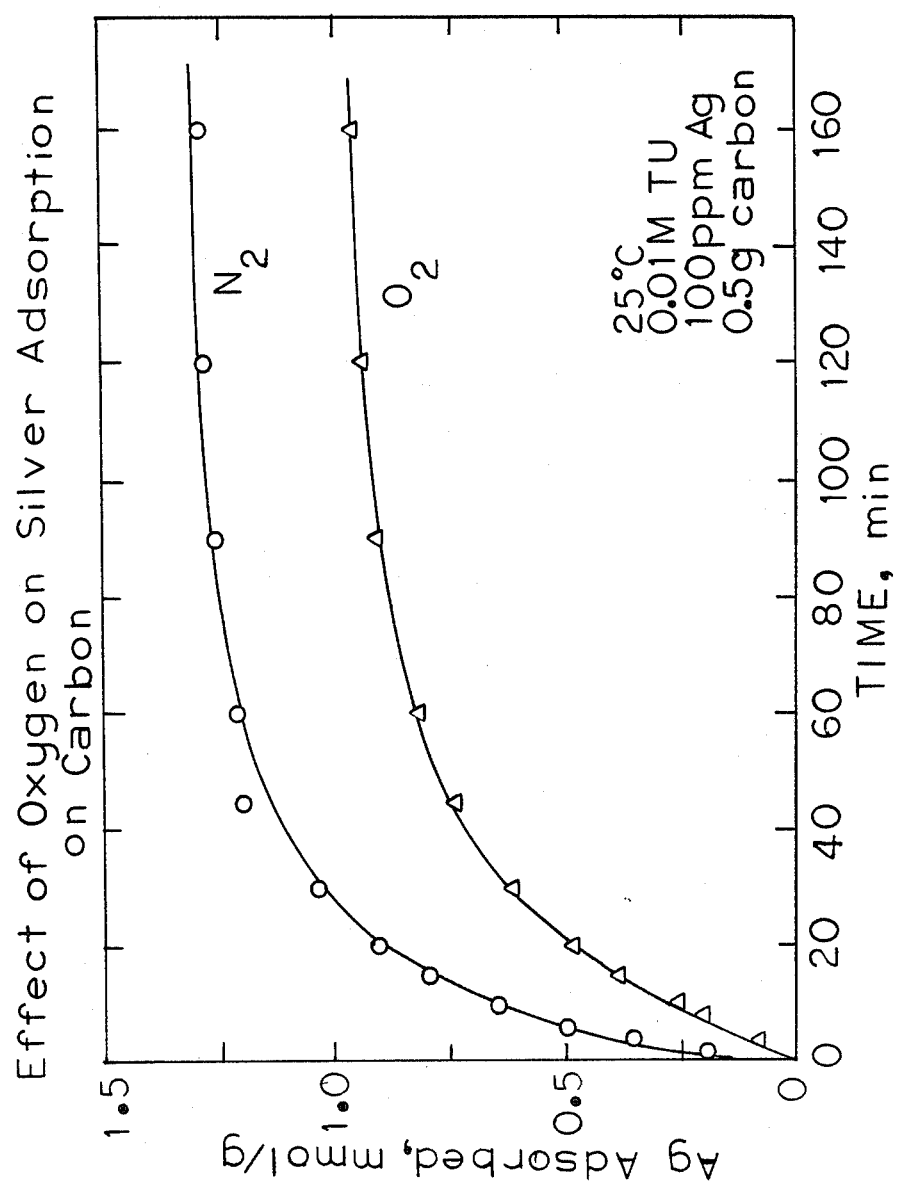
FIG. 8 is a graph depicting the effect of the presence of oxygen on the adsorption of silver on carbon.
Figure 9:
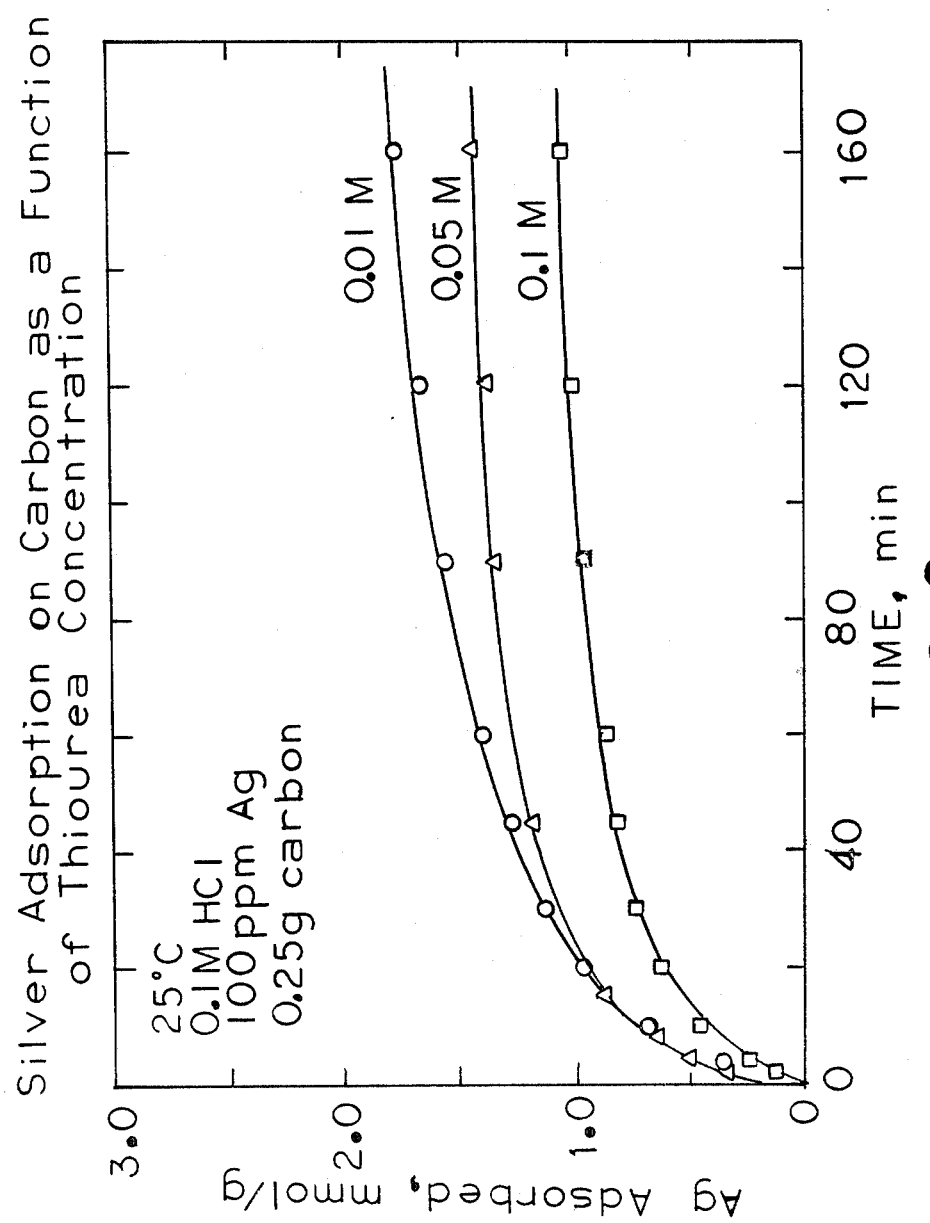
FIG. 9 is a graph depicting the effect of thiourea concentration on the loading of silver on carbon.

Temperature is a very important parameter for desorption of silver from activated carbon with thiosulfates. As shown in FIG. 4, much faster desorption rates of silver can be achieved at higher temperatures. Even moderately high temperatures, such as 60 deg. C, are sufficient for efficient desorption of silver. In FIG. 4, almost 90% of silver was desorbed in only 2 hours of treatment with sodium thiosulfate. In another example, when loaded carbon was treated at 80 deg. C with sodium thiosulfate, almost 100% of silver was desorbed in only 80 minutes of elution. It should be noted, from FIG. 4, that even at room temperatures the desorption rate of silver is not slow, and room temperature can be used in cases where kinetics is not of critical importance.

Just as with silver, to achieve the desorption of gold from activated carbon loaded from thiourea solutions, a thiosulfate solution is used. When a solution of thiosulfate is mixed with the loaded activated carbon, the thiosulfate ion positions itself on the surface of carbon displacing gold-thiourea complexes which then goes into the solution. Gold can be further recovered from the eluate solution by any classical method (electrowinning, cementation, chemical precipitation).

As in the case of silver, the main process parameters for eluting gold are: pH, thiosulfate concentration, and temperature.

With respect to pH, the higher the pH the higher the desorption of gold. See FIG. 5. From FIG. 5 it is noticed that thiosulfate ion is an excellent agent for desorption of gold. Gold desorption with thiosulfate ion is much faster than silver desorption. Thus, at moderate temperature, T=50 deg. C, and not very high concentrations of thiosulfate ions, 50 gpl, complete desorption of gold can be achieved within only 2 hours. More than 70% of gold is desorbed within the first 10 minutes. This is an extremely desirable result.

With respect to pH, the comments set forth for desorption of silver relating to the lower and upper pH limits, are applicable for desorption of gold also.

The concentration of thiosulfate had virtually no effect on desorption of gold under the experimental conditions. Almost identical results were obtained for two different thiosulfate concentrations, 10 gpl and 50 gpl, respectively. For these two concentrations, at pH=8.5 and at T=50 deg. C, 100% gold was desorbed within 2 hours of treatment. However, in an industrial practice, where the ratio of elution solution to activated carbon is much smaller, the thiosulfate concentration should have a pronounced effect.

The next important parameter is temperature. As in the case with silver, gold desorption is much faster at higher temperatures. Se FIG. 6. At T=50 deg. C., and pH=8.5, 100% of gold can be extracted within two hours of treatment with sodium thiosulfate. At T=80 deg. C. the same result was achieved within 20 minutes of treatment.

The elution of gold and silver from the carbon is affected by the presence of various ions. Some of them have a positive effect, and some of them have a negative effect. The ion having the most detrimental effect on the elution of gold and silver with sodium thiosulfate is copper ion. In the presence of copper ion, elution of metals is decreased by half. Copper ion tends to destroy the thiosulfate as well.

Other ions such as alkali metal ions and alkaline earth metal ions (e.g., Na, K, and Ca), have a somewhat positive effect on gold and silver desorption. All of these effects were proved in separate experiments.

Pretreatment of loaded activated carbon with hydrogen peroxide can also help the desorption of these metals. Here, one has to carefully use this oxidant because if too much is applied it will distintegrate activated carbon.

Having discussion the desorption of gold and silver thiourea complexes from carbon, a discussion follows as to considerations relating to the adsorption of silver and gold thiourea complexes onto the carbon.

Silver can be very efficiently recovered from thiourea solutions by activated carbon. (Pesic B. and J. E. Wey: Carbon Adsorption of Silver from Acidified Thiourea Solutions, Soc. Mining Engineers of AIME. Preprint No. 86-29, New Orleans, La., Mar. 2-6, 1986). Loading of silver from thiourea solutions is much higher, at least 10 times, than the loading of silver from cyanide solutions. See FIG. 7 of the present patent.

When adsorbing silver from thiourea solutions one has to consider, carefully, a number of process parameters such as: gas atmosphere, thiourea concentration, and pH.

The loading of silver is higher in a nitrogen protected atmosphere than in an oxygen atmosphere. See FIG. 8.

The concentration of thiourea is also important. See FIG. 9. The higher the excess thiourea concentration, the less the number of active sites on the carbon that are available for silver adsorption.

Figure 10:
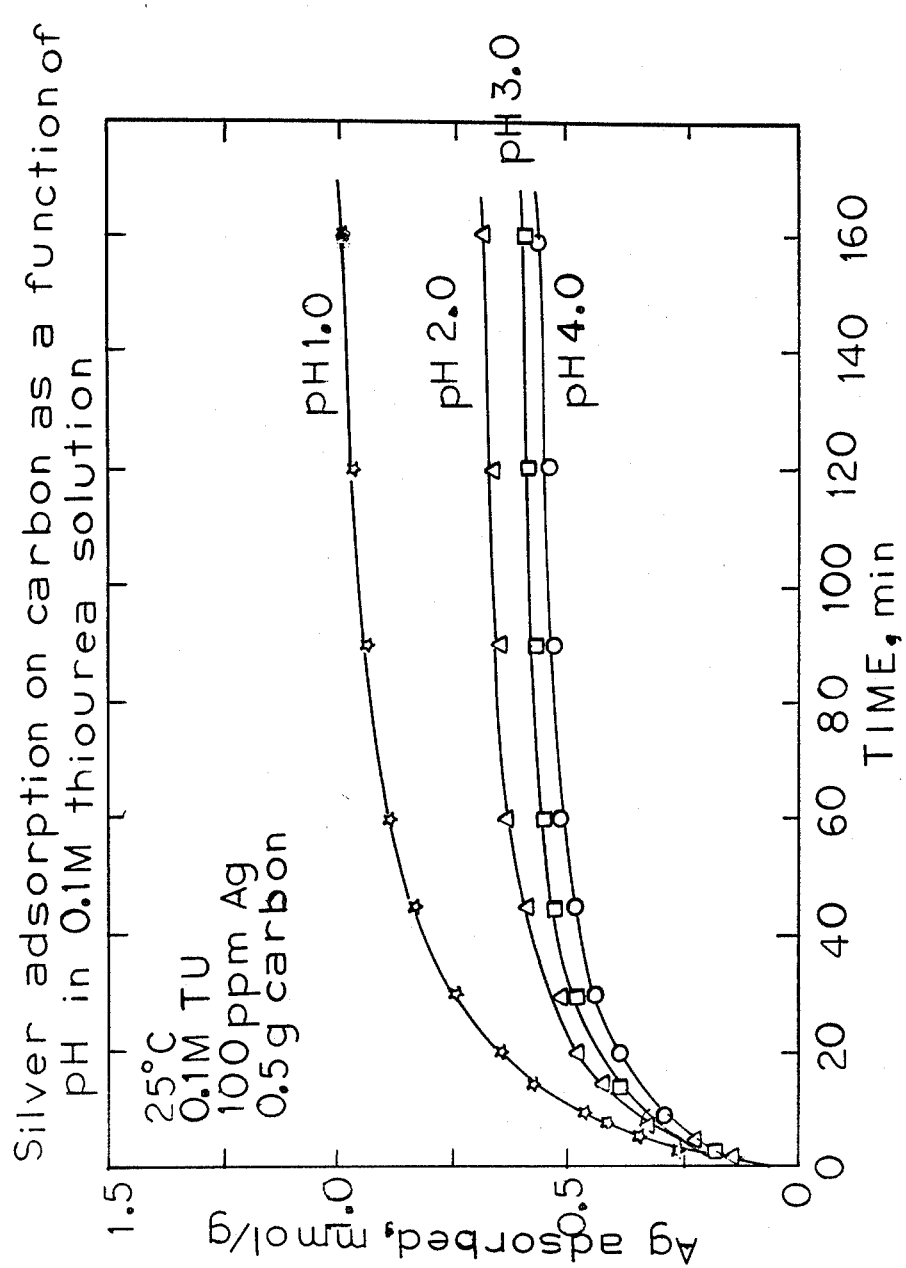
FIG. 10 is a graph depicting the effect of pH on the loading of silver on carbon in the presence of thiourea.

The acidity of the solution used to load the carbon is another important parameter. The effect of pH on silver adsorption is shown in FIG. 10, where it can be seen that the lower the pH, the higher the kinetics of loading of silver on carbon.

Figure 17:
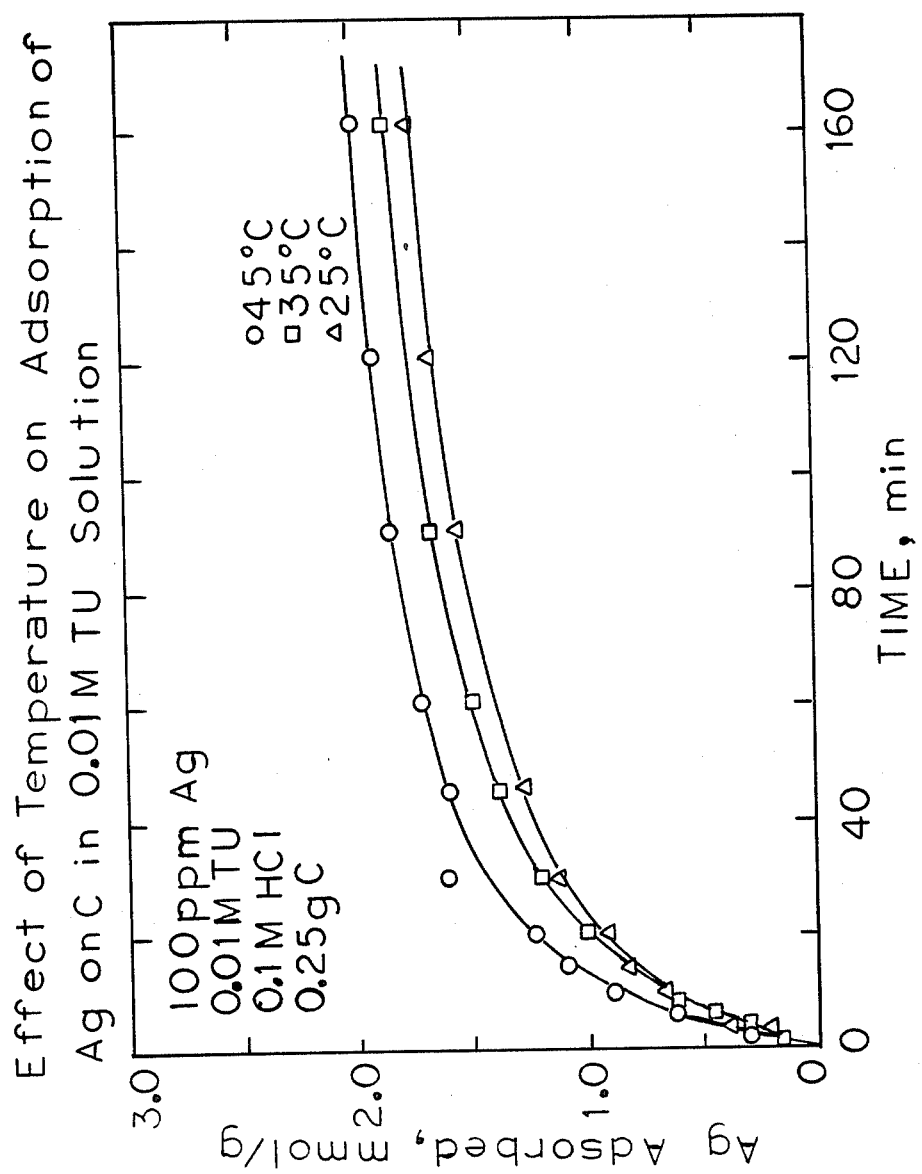
FIG. 17 is a graph depicting the effects of temperature on the adsorption of silver on carbon in 0.01M thiourea solution.
Figure 18:
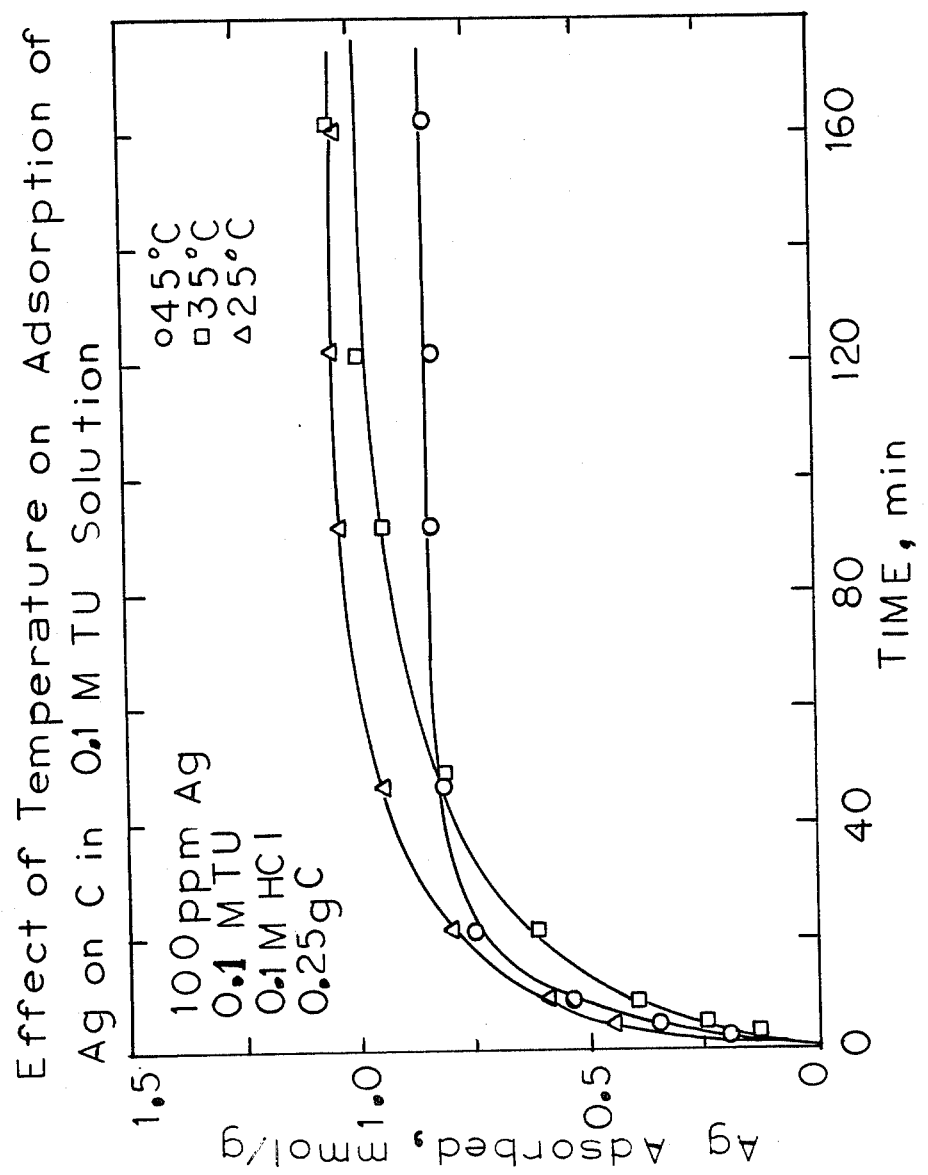
FIG. 18 is a graph depicting the effects of temperature on the adsorption of silver on carbon in 0.1M thiourea solution.

The effect of temperature on the adsorption of silver from thiourea solution is shown in FIG. 17 and FIG. 18 for 0.01M and 0.1M thiourea, respectively. The temperatures of 25 deg. C., 35 deg. C., and 45 deg. C. were examined. Higher temperatures than 45 deg. C. were not investigated due to possible partial degradation of the thiourea. From FIG. 17 it can be seen that for dilute (0.01M) thiourea solution, the initial rate and amount silver adsorbed from solution are nearly independent of temperature. The results from FIG. 18, however, show that at higher temperatures in more concentrated thiourea solution the adsorption of silver decreases. It is also noted that at a fixed temperature, the amount of silver adsorbed per gram of charcoal is greater in 0.01M thiourea solution than in 0.1M thiourea solution. These effects are due to the increasing competition of thiourea with silver for adsorption sites on the charcoal as the thiourea concentration is increased and show that silver can be displaced from the carbon surface by increasing the temperature and concentration of thiourea in solution.

A critical parameter relating to effective carbon loading of silver is the presence of copper ions. Copper is extremely detrimental for silver adsorption, and even small amounts of copper can depress silver adsorption on carbon dramatically. The removal of copper prior to silver adsorption may be a very important preliminary step in a practical application.

Figure 11:
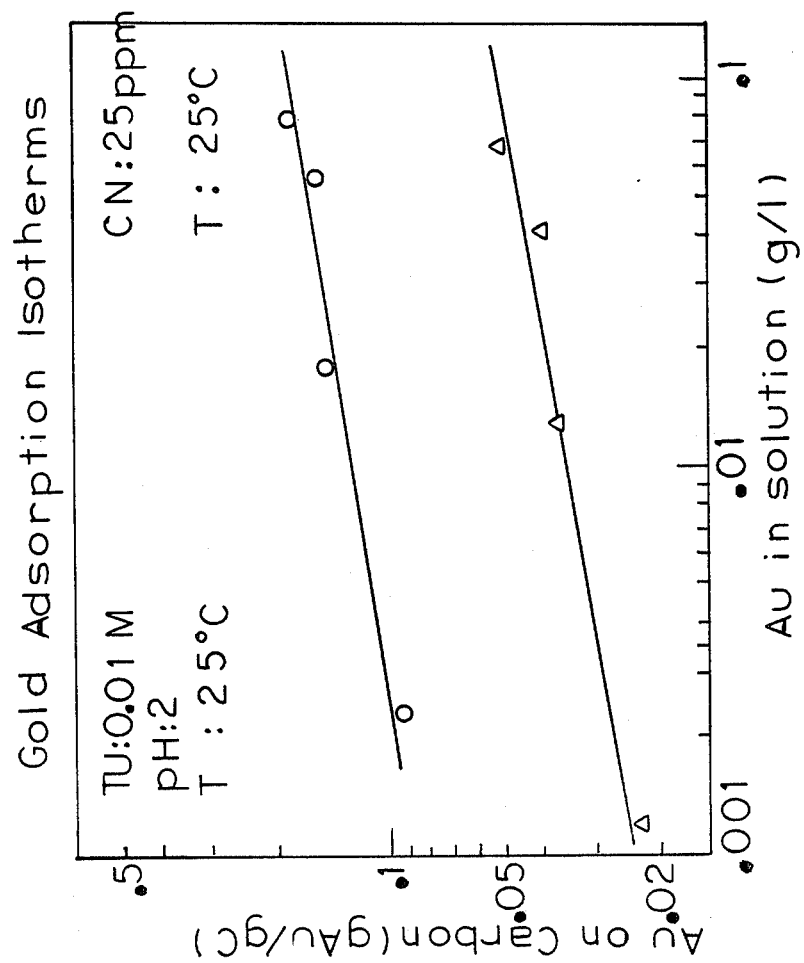
FIG. 11 is a graph showing the increased efficiency of loading of gold on carbon from thiourea solutions as compared to loading the carbon with gold from cyanide solutions.
Figure 12:
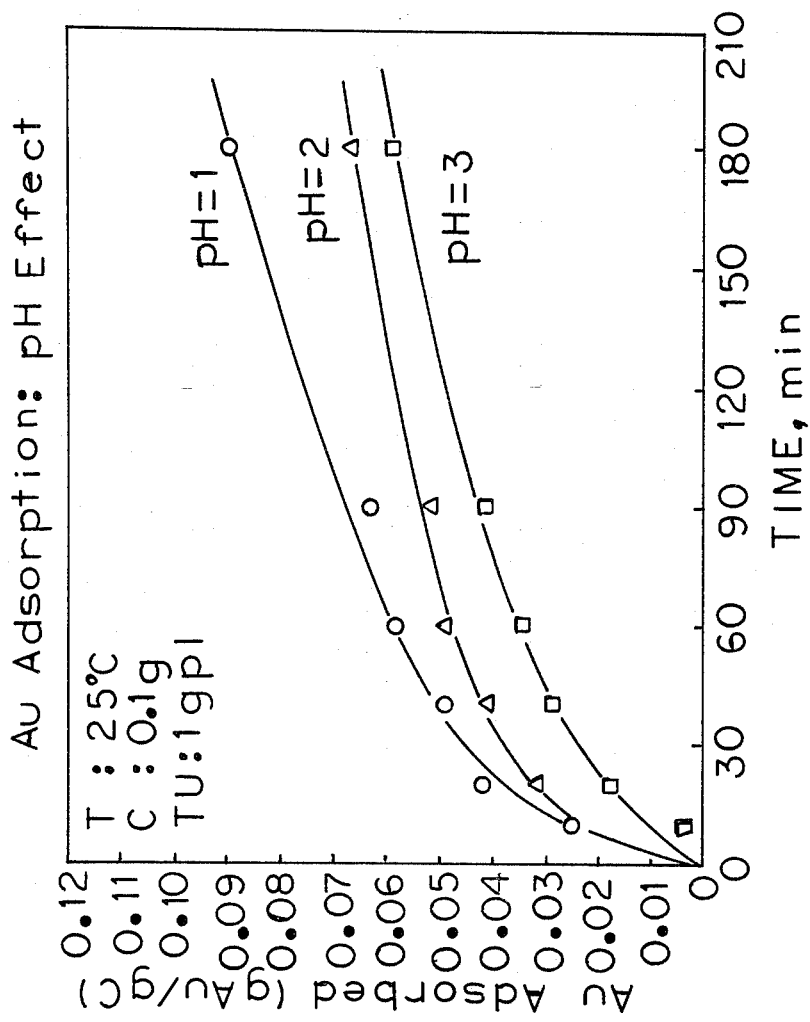
FIG. 12 is a graph depicting the effect of pH on the loading of gold on carbon in the presence of thiourea.
Figure 13:
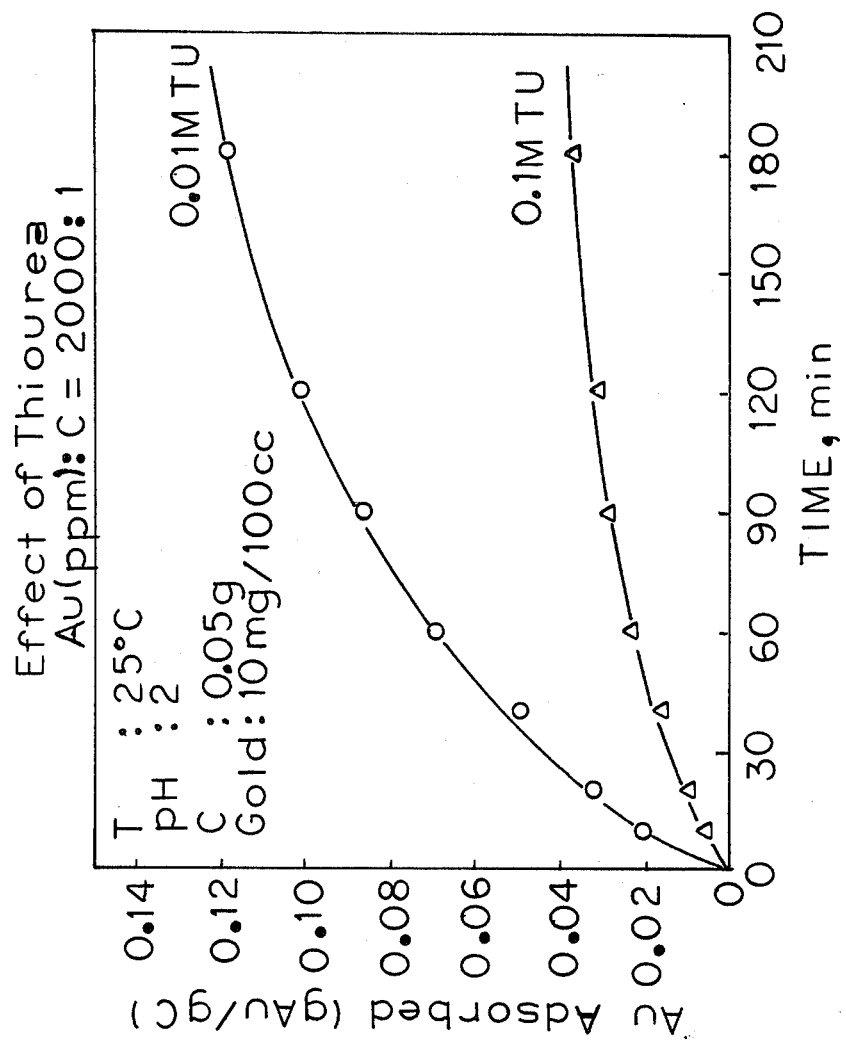
FIG. 13 is a graph depicting the sensitivity of gold adsorption on carbon with respect to thiourea concentration when a relatively small amount of carbon is used (e.g. the ratio of gold to carbon of 2,000 to 1).
Figure 14:
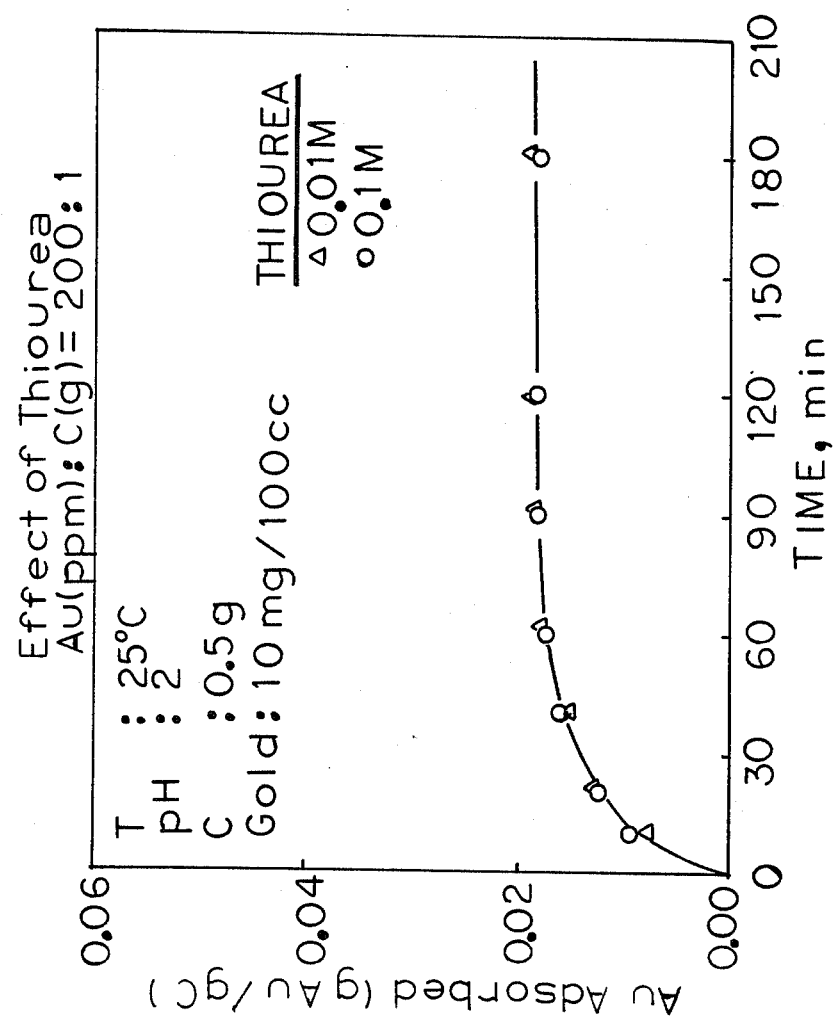
FIG. 14 is a graph depicting the insensitivity of gold adsorption on carbon with respect to thiourea concentration when a larger amount of carbon is used (e.g. the ratio of gold to carbon of 200 to 1).
Figure 15:
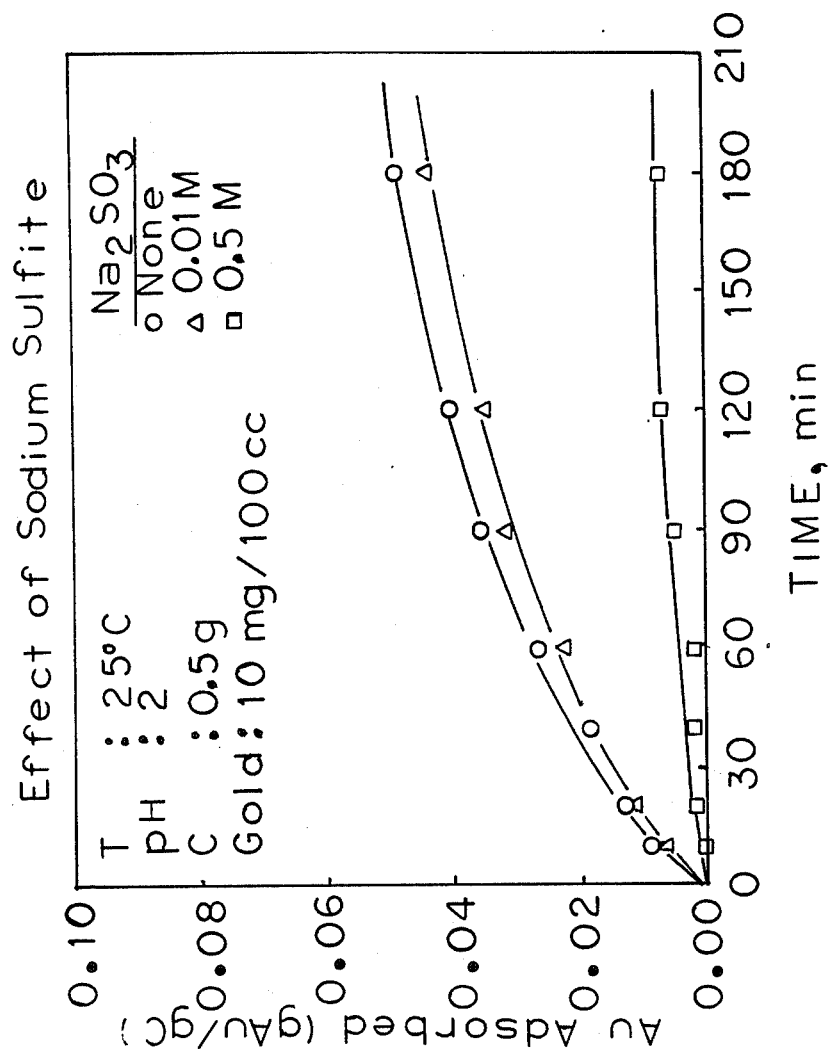
FIG. 15 is a graph depicting the deleterious effect of excess sodium sulfite on the adsorption of gold on carbon.
Figure 16:
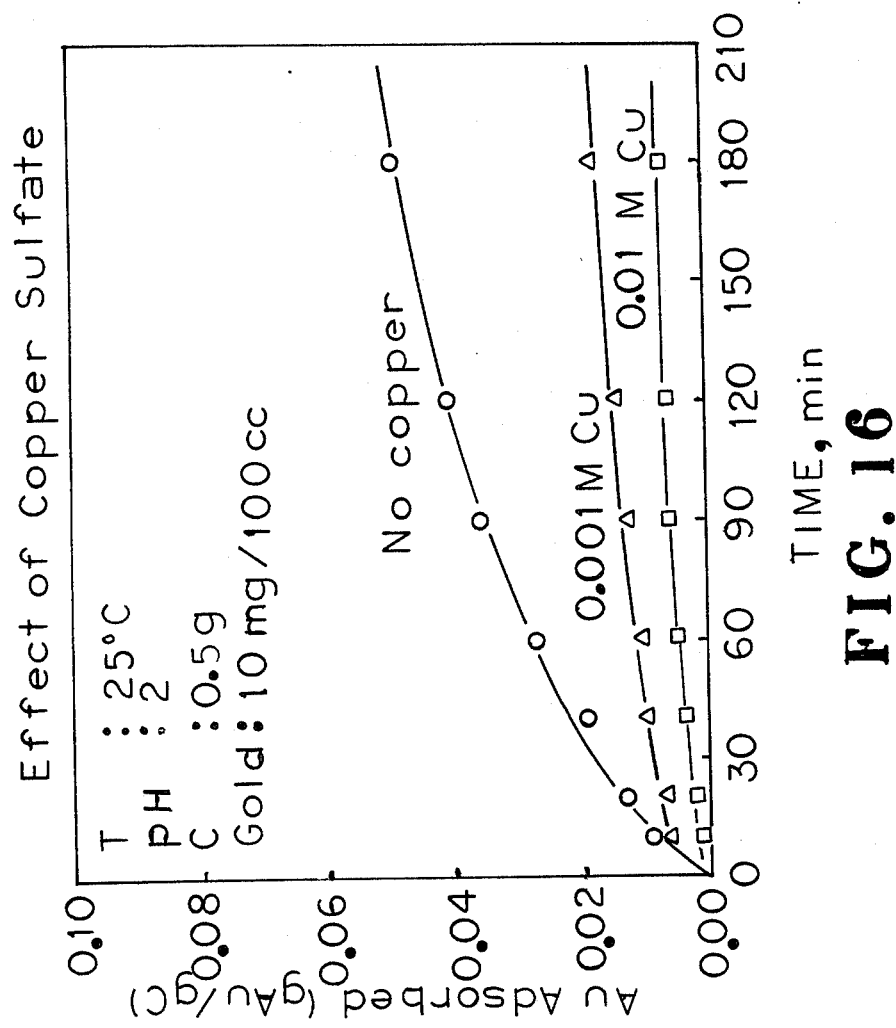
FIG. 16 is a graph depicting the deleterious effect of copper sulfate on the adsorption of gold on carbon.

In another study relating to gold, this study by the present inventor Batric Pesic, it was determined that gold forms very stable soluble complexes with thiourea which can be recovered from solutions by activated carbon. (Pesic B.: Carbon Adsorption of Gold from Activated Carbon Loaded from Acidified Thiourea Solutions. Paper presented at the Annual AIME Meeting, Denver, CO, Feb. 23-26, 1987). The loading capacity of carbon for gold-thiourea complexes is much higher than the loading capacity for gold-cyanide complexes as is well illustrated in FIG. 11. FIG. 11 demonstrates that the loading capacity of carbon for gold from thiourea solutions can be 10-20% of the weight of carbon, while the loading from cyanide solutions is much less, 2-4% of the weight of carbon.

When gold is recovered on carbon from thiourea solutions, process parameters to be considered include: pH, thiourea concentration, and composition of the solution. The kinetics of gold adsorption from thiourea solutions is faster at lower pH than at higher pH. See FIG. 12.

Thiourea concentration is also an important parameter. Thiourea is an organic molecule that has a high tendency to adsorb on activated carbon. When there is not enough carbon, or the number of surface active sites is not sufficient for adsorbing both gold-thiourea complexes and free thiourea, then thiourea will be loaded preferentially over gold, and gold adsorption will be suppressed. See FIG. 13. However, when there is plenty of carbon, or the number of surface active sites exceeds the total number of molecules to be adsorbed, then free thiourea doesn't interfere with adsorption of gold-thiourea complexes. See FIG. 14.

Adsorption of gold from thiourea solutions is very susceptible to the strongly reducing or strongly oxidizing conditions. Thus, sodium sulfite, as a reducing agent, suppresses gold adsorption. See FIG. 15. However, sodium sulfite, or another suitable reducing agent, can be added to a thiosulfate eluting agent to reduce the presence of an oxidizing agent.

In strongly oxidizing conditions, such as those produced by addition of hydrogen peroxide, adsorption of gold was slightly suppressed initially, but after longer periods of time, gold-thiourea complexes became unstable and metallic gold precipitated. Thus, preferably, the thiosulfate eluting solution should not have an excess of oxidizing agent.

Another important process parameter for recovery of gold from thiourea solutions is the presence of various ions. It was found, (Pesic B.: Carbon Adsorption of Gold from Activated Carbon Loaded from Acidified Thiourea Solutions. Paper presented at the Annual AIME Meeting, Denver, CO, Feb. 23-26, 1987), that alkali metal and alkaline earth metal elements (e.g., Na, K, Ca) promote adsorption of gold on carbon. Most of the heavy metals, such as Ni, Zn, Co, Cr, etc., didn't have any effect on gold adsorption. Ferric ion suppressed gold adsorption somewhat. However, ferric iron is necessary for gold dissolution, and it cannot be eliminated from leaching solutions, but rather its concentration must be optimized.

Extremely detrimental to effective adsorption of gold is the presence of copper ion. See FIG. 16. Even small amounts of copper, as low as 0.001M Cu, can dramatically suppress adsorption of gold on activated carbon. To successfully adsorb gold on carbon, copper must be eliminated from solutions prior to carbon adsorption. Such an objective can be difficult to attain in some cases, such as carbon-in-pulp leaching, where leaching of gold and adsorption of gold occur simultaneously.

The foregoing description of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A method for recovering precious metals from precious metal bearing materials, said method comprising the steps of:

extracting the precious metal bearing materials with thiourea to form a thiourea leach solution;

contacting the thiourea leach solution with carbon to load the carbon with the precious metals;

contacting thiosulfate ion with the loaded carbon, the thiosulfate ion separating the precious metals from the carbon, the precious metals selected from the group consisting of silver and gold.

2. A method for recovering precious metals from precious metal bearing materials described in claim 1 wherein the thiourea is in aqueous solution.

3. A method for recovering precious metals from precious metal bearing materials described in claim 1 wherein the thiosulfate ion is contacted with the loaded carbon under alkaline conditions.

4. A method for recovering precious metals from precious metal bearing materials described in claim 1 wherein the thiosulfate ion is obtained from a water soluble thiosulfate compound.

5. A method for recovering precious metals from precious metal bearing materials described in claim 4 wherein the thiosulfate ion is in the form of an aqueous solution and forms a thiosulfate leach solution upon contacting the loaded carbon.

6. A method for recovering precious metals from precious metal bearing materials described in claim 5, further including the step of adding a salt to the aqueous thiosulfate solution.

7. A method for recovering precious metals from precious metal bearing materials described in claim 6 wherein the added salt is selected from the group consisting of alkali-metal and alkaline-earth-metal chlorides, nitrates, and sulfates.

8. A method for recovering precious metals from precious metal bearing materials described in claim 5 wherein the thiosulfate concentration is in the range of from 0.1 gram per liter to a saturated solution.

9. A method for recovering precious metals from precious metal bearing materials described in claim 5 wherein the pH of the aqueous thiosulfate solution is in a range having a lower end and an upper end, the lower end of the range of pH of the solution being sufficiently high to maintain the stability of the thiosulfate ion in the aqueous solution, the upper end of the range of pH of the solution being sufficiently low to maintain the stability of the carbon in the presence of the aqueous solution.

10. A method for recovering precious metals from precious metal bearing materials described in claim 5 wherein the pH of the aqueous thiosulfate solution is in the range of pH=8-10.5.

11. A method for recovering precious metals from precious metal bearing materials described in claim 5 wherein the thiosulfate is contacted with the carbon at a temperature equal to the boiling point of the thiosulfate solution.

12. A method for recovering precious metals from precious metal bearing materials described in claim 5 wherein the thiosulfate is contacted with the carbon at a temperature in the range from 1-100 degrees centrigade.

13. A method for recovering precious metals from precious metal bearing materials described in claim 1 wherein the thiosulfate is contacted with the carbon at a pressure in the range of normal atmospheric pressure to 100 pounds per square inch.

14. A method for recovering precious metals from precious metal bearing materials described in claim 1 wherein the thiosulfate ion is obtained from a compound selected from the group consisting of alkali metal thiosulfates, alkaline earth metal thiosulfates, and ammonium thiosulfate.

15. A method for recovering precious metals from precious metal bearing materials described in claim 1 wherein the thiosulfate ion is obtained from a compound selected from the group consisting of sodium thiosulfate, ammonium thiosulfate, potassium thiosulfate, and calcium thiosulfate.

16. A method for recovering precious metals from precious metal bearing materials described in claim 1 wherein the carbon is activated carbon.

17. A method for recovering precious metals from precious metal bearing materials described in claim 1 wherein the precious metals loaded on the carbon are in the form of thiourea complexes.

18. A method for recovering precious metals from precious metal bearing materials described in claim 1, further including the step of protecting the thiosulfate from oxidizing agents by adding a reducing agent to the thiosulfate.

19. A method for recovering precious metals from precious metal bearing materials described in claim 18 wherein the reducing agents are selected from the group consisting of sulfites.

20. A method for recovering precious metals from precious metal bearing materials described in claim 19 wherein the reducing agent is sodium sulfite.

21. A method for recovering precious metals from precious metal bearing materials described in claim 1, further including the initial step of preventing cooper from being adsorbed onto the carbon by removing copper from the thiourea leach solution prior to exposing the carbon to the thiourea leach solution containing the precious metal.

22. A method for recovering precious metals from precious metal bearing materials described in claim 1, further including the initial step of pretreating the carbon loaded with the precious metals with an oxidizer prior to contacting the metals with thiosulfate.

23. A method for recovering precious metals from precious metal bearing materials described in claim 1 wherein the carbon loaded with the precious metals is treated initially with a material selected from the group consisting of hydrogen peroxide.

24. A method for recovering silver from silver bearing materials, said method comprising the steps of:

extracting the silver bearing materials with thiourea to form a thiourea leach solution;

contacting the thiourea leach solution with carbon to load the carbon with the silver;

contacting thiosulfate ion with the loaded carbon, the thiosulfate ion separating the silver from the carbon.

25. A method for recovering gold from gold bearing materials, said method comprising the steps of:

extracting the gold bearing materials with thiourea to form a thiourea leach solution;

contacting the thiourea leach solution with carbon to load the carbon with the gold;

contacting thiosulfate ion with the loaded carbon, the thiosulfate ion separating the gold from the carbon.

26. A method for recovering silver and gold from gold and silver bearing materials, said method comprising the steps of:

extracting the gold and silver bearing material with thiourea to form a thiourea leach solution;

contacting the thiourea leach solution with carbon to load the carbon with the gold and silver;

contacting thiosulfate ion with the loaded carbon under a set of contacting conditions including temperature, concentration of thiosulfate ion, and duration of contact to form a thiosulfate leach solution containing both the gold and the silver.

27. A method for separating precious metals loaded on carbon from a thiourea solution, said method comprising the step of contacting thiosulfate ion with the carbon loaded with precious metals from the thiourea solution, the thiosulfate ion separating the precious metals from the carbon, the precious metals selected from the group consisting of gold and silver.

28. A method for recovering precious metals from a material, said method comprising the steps of:

extracting the material with acidified thiourea to form a thiourea leach solution;

contacting the thiourea leach solution with carbon to load the carbon with the precious metals;

contacting thiosulfate ion under alkaline conditions with the loaded carbon, thereby desorbing the precious metals from the carbon and deactivating the carbon, the precious metals selected from the group consisting of silver and gold;

recycling the carbon by contacting the deactivated carbon with another quantity of acidified thiourea leach solution, the acidified thiourea solution reactivating the carbon and permitting further adsorption of thiourea complexes of gold and silver thereon.

* * * * *